(12) United States Patent
Cho

(10) Patent No.: US 6,931,426 B2
(45) Date of Patent: Aug. 16, 2005

(54) APPARATUS AND METHOD FOR DETECTING OPERATION VALUE USING LOOKUP-TABLE

(75) Inventor: Bong-hwan Cho, Kyungki-do (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 607 days.

(21) Appl. No.: 09/755,189

(22) Filed: Jan. 8, 2001

(65) Prior Publication Data

US 2001/0027540 A1 Oct. 4, 2001

(30) Foreign Application Priority Data

Jan. 11, 2000 (KR) .......................................... 2000-1189

(51) Int. Cl.⁷ ................................................ G06F 1/02
(52) U.S. Cl. ..................................................... 708/272
(58) Field of Search ................................. 708/270–277, 708/290, 440

(56) References Cited

U.S. PATENT DOCUMENTS 4,326,260 A * 4/1982 Gross ......................... 708/272
4,682,152 A * 7/1987 Okamoto et al. .............. 341/95
5,951,625 A * 9/1999 Duvanenko et al. ........ 708/290

* cited by examiner

*Primary Examiner*—Chuong D Ngo
(74) *Attorney, Agent, or Firm*—Sughrue Mion, PLLC

(57) ABSTRACT

An apparatus and method for detecting an operation value using a look-up table at high speed, which not only minimizes the size of the look-up table but also satisfies a desired error rate. The apparatus includes a means for storing seed values corresponding to seed points determined according to the range of the input data and output data and an error rate, an address and data generator for comparing a predetermined reference value with the input data to generate an address of the storing means and revised input data corresponding to the input data, and an operator for performing a predetermined operation using the seed values output from the storing means and the revised input data generated by the address and data generator to output an operation value corresponding to the input data. Accordingly, an operation value having a minimum error rate can be provided with a small sized memory.

11 Claims, 5 Drawing Sheets

APPARATUS AND METHOD FOR DETECTING OPERATION VALUE USING LOOKUP-TABLE

BACKGROUND OF THE INVENTION

1. Field of the Invention

The present invention relates to an apparatus and method for detecting a desired operation result at high speed, and more particularly, to an apparatus and method for detecting a desired operation value using a look-up table at high speed. The present application is based on Korean Patent Application No. 2000-1189 filed on Jan. 11, 2000, which is incorporated herein by reference.

2. Description of the Related Art

A simple operation permits an operation value corresponding to input data to be detected at high speed (within one system clock cycle, for example). Conversely, a complex operation makes it difficult to detect a corresponding operation value at high speed. Thus, if an operation is complex, a technique using a look-up table consisting of random access memory (RAM) or read only memory (ROM) is mainly employed to achieve high speed detection of a corresponding operation value.

A representative example of use of the look-up table is gamma correction. As is widely known, gamma correction compensates for gamma effect produced in a non-linear fashion due to a material such as phosphor used in an environment where output data having a linear relationship with input linear data is needed. The operation for this compensation is complex. Thus, conventional gamma correction is implemented in such a way as to store an operation value corresponding to input data in a look-up table having a depth of $2^N$ and outputs the operation value stored in the look-up table using the input data as an address.

The conventional method has no problems in detecting an operation value using a look-up table, if the range of input data is narrow. However, if the range is wide, the conventional method suffers from a problem in which the size of the look-up table becomes larger, thereby increasing the overall size of a system while increasing the cost for such an implementation.

SUMMARY OF THE INVENTION

To solve the above problems, it is an objective of the present invention to provide an apparatus for detecting an operation value at high speed using a look-up table, while keeping the size of the look-up table to a minimum.

It is another objective of the invention to provide an apparatus for detecting an operation value at high speed using a look-up table that minimizes the error in the real operation value.

Accordingly, to achieve the above objectives, the present invention provides an apparatus for detecting an operation value for input data including a means for storing seed values corresponding to seed points determined by the range of the input data and output data and an error rate, an address and data generator for comparing a predetermined reference value with the input data to generate an address of the storing means and revised input data corresponding to the input data, and an operator for performing a predetermined operation to output an operation value corresponding to the input data, using the seed values output from the storing means and the revised input data generated by the address and data generator.

The present invention also provides a method for detecting an operation value corresponding to input data including the steps of storing seed values corresponding to seed points determined by the ranges of the input data and output data and an error rate, analyzing which of the addresses of the stored seed values approaches the input data, generating an upper address and a lower address corresponding to the arbitrary input data according to the analyzed result in the analysis step; reading seed values corresponding to the upper and lower addresses generated in the step of generating the addresses from the seed values stored in the storing step, revising the input data according to the analyzed result in the analysis step, and performing a predetermined operation using the upper and lower addresses, the seed values read in the reading step, and the revised input data to output an operation value corresponding to the input data.

BRIEF DESCRIPTION OF THE DRAWINGS

The above objective(s) and advantages of the present invention will become more apparent by describing in detail a preferred embodiment thereof with reference to the attached drawings in which.

DETAILED DESCRIPTION OF THE INVENTION

Figure 1:
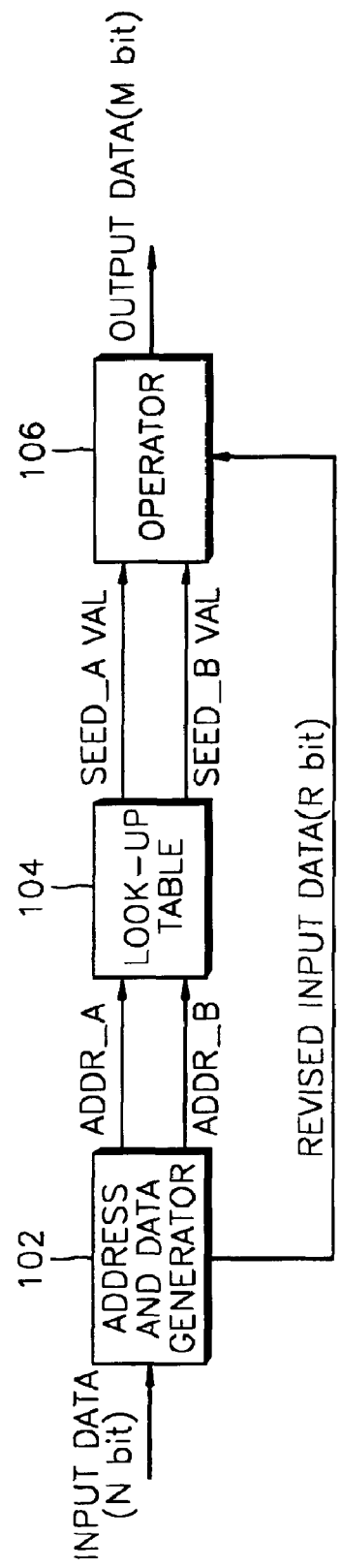
FIG. 1 is a unction block diagram showing an apparatus for detecting an operation value using a look-up table according to the present invention.

Referring to FIG. 1, an apparatus for detecting an operation value using a look-up table according to the present invention includes an address and data generator 102 for generating addresses ADDR_A and ADDR_B and revised input data using input data, a look-up table 104 for storing unevenly spaced seed values, and an operator 106 for outputting data based on the revised input data provided from the address and data generator 102 and seed values SEED_A VAL and SEED_B VAL output from the look-up table 104. In this case, the output data of the operator 106 is an operation value corresponding to the input data.

Figure 2:
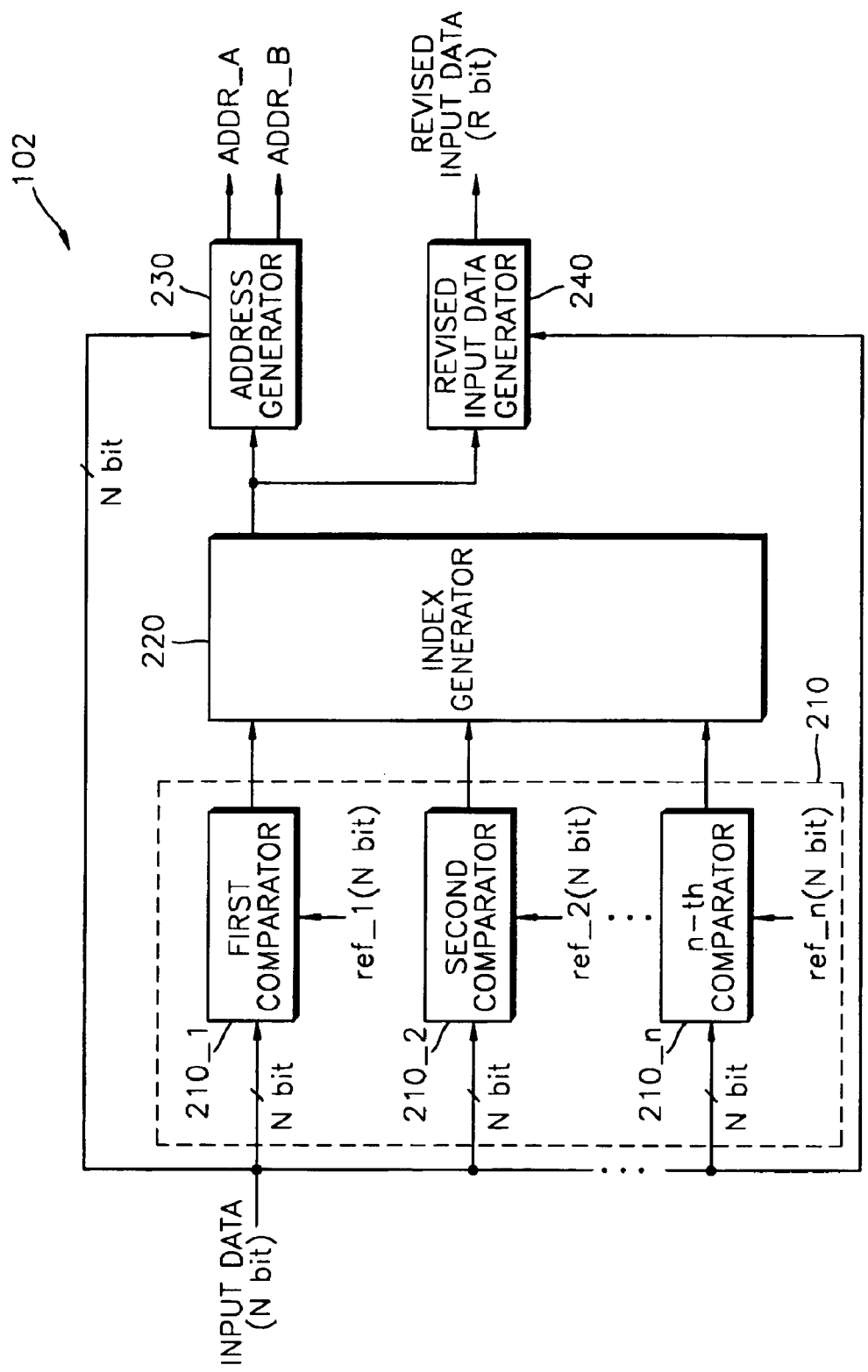
FIG. 2 is a detailed block diagram showing the address and data generator of FIG. 1.

Referring to FIG. 2, the address and data generator 102 includes a comparison unit 210 consisting of first through n-th comparators 210_1–210_n, an index generator 220, an address generator 230, and a revised input data generator 240. The address and data generator 102 generates an upper address ADDR_A, a lower address ADDR_B, and revised input data, all of which correspond to the input data.

The first through n-th comparators 210_1 through 210_n transmit to the index generator 220 the result of comparing corresponding reference values ref_1 through ref_n with applied input data. In this case, the comparison result is data for determining whether or not the input data is less than the reference values ref_1 through ref_n. For example, if the input data is less than the reference value ref_1, the first comparator 210_1 outputs '0', and if not, it outputs '1'.

The number n of comparators 210_1–210_n is determined by the maximum number obtained when the difference between real address values of the seeds stored in the look-up table 104 is a power of 2. For example, when real seed values stored in the look-up table 104 and information corresponding thereto are as shown in Table 1 below, $2^0$, $2^1$, $2^2$, $2^3$, $2^5$, $2^7$, $2^9$, $2^{11}$, $2^{13}$, and $2^{15}$ are obtained if the differences between seed addresses are powers of 2. Thus, the number of comparators provided in the comparison unit 210 is ten. For example, if a seed address is '6', a preceding seed address is '4' and the difference between the seed addresses are '2'. Thus, $2^1$ is derived from power of 2 corresponding to the difference between seed addresses.

TABLE 1

| Seed address | Difference | Exponent | Real seed value | Powers of 2 |
|---|---|---|---|---|
| 0 | | | 65536 | |
| 1 | 1 | 0 | 65536 | $2^0$ |
| 2 | 1 | 0 | 46341 | $2^0$ |
| 3 | 1 | 0 | 37837 | $2^0$ |
| 4 | 1 | 0 | 32768 | $2^0$ |
| 6 | 2 | 1 | 26766 | $2^1$ |
| 8 | 2 | 1 | 23170 | $2^1$ |
| 12 | 4 | 2 | 18919 | $2^2$ |
| 16 | 4 | 2 | 16384 | $2^2$ |
| 24 | 8 | 3 | 13377 | $2^3$ |
| : | : | : | : | : |
| 64 | 8 | 3 | 8192 | $2^3$ |
| 96 | 32 | 5 | 6689 | $2^5$ |
| : | : | : | : | : |
| 266 | 32 | 5 | 4096 | $2^5$ |
| 384 | 128 | 7 | 3344 | $2^7$ |
| : | : | : | : | : |
| 1024 | 128 | 7 | 2048 | $2^7$ |
| 1536 | 512 | 9 | 1672 | $2^9$ |
| : | : | : | : | : |
| 4096 | 512 | 9 | 1024 | $2^9$ |
| 6144 | 2048 | 11 | 836 | $2^{11}$ |
| : | : | : | : | : |
| 16384 | 2048 | 11 | 512 | $2^{11}$ |
| 24576 | 8192 | 13 | 418 | $2^{13}$ |
| : | : | : | : | : |
| 65536 | 8192 | 13 | 256 | $2^{13}$ |
| 98304 | 32768 | 15 | 209 | $2^{15}$ |
| : | : | : | : | : |

The reference values ref_1 through ref_n are seed addresses stored in the look-up table 104 before the exponent of 2 corresponding to the difference between addresses is changed. That is, assuming that the seed values stored in the look-up table 104 and information corresponding thereto are as shown in Table 1 above, 4, 8, 16, 64, 256, 1024, 4096, 16384, 65536 are the reference values ref_1 through ref_n to be assigned to the first through n-th comparators 210_1 through 210_n. For example, a reference value ref_1 to be set to the first comparator 210_1 is '4'. A reference value to be set is represented by the same number of bits as the input data. For example, if the input data is represented by 18 bits, the reference value '4' assigned to the first comparator 210_1 is set to '0000 0000 0000 0001 00'.

The index generator 220 outputs corresponding index information according to the comparison results transmitted from each of the first through n-th comparators. The index information is for determining the relationship between the currently applied input data and a real seed address stored in the look-up table 104, and the number of bits of revised input data. A value corresponding to the exponent of 2 in the above Table 1 is output as index information. That is, if the currently applied input data has a value less than '4', the comparison result of comparison unit 210 provided to the index generator 220 is '1000000000', and the index information generated by the index generator 220 is '0' which is the exponent in $2^0$. The output index information is transmitted to both the address generator 230 and the revised input data generator 240.

The address generator 230 outputs corresponding upper and lower addresses ADDR_A and ADDR_B depending on the result of determining which of the real seed addresses approaches the currently applied input data. In other words, the address generator 230 extracts corresponding data bits from the input data based on the index information, and analyzes values of the extracted data bits to output the upper and lower addresses ADDR_A and ADDR_B. For example, if '0' is applied as the index information, bits corresponding to bit positions $2^5$ through $2^0$ among the currently applied input data are extracted. If the value of the extracted bit is '3', '000011' corresponding to '3' is output as the upper address ADDR_A while '000100' corresponding to '4' is output as the lower address ADDR_B.

However, if the extracted bit value is not contained in real seed addresses stored in the look-up table 104, the address generator 230 generates upper and lower addresses approximating that value. For example, if as a result of analyzing bits of the currently applied data, the value is '5', '000100' corresponding to '4' is output as the upper address ADDR_A and '000110' corresponding to '6' is output as the lower address ADDR_B. The upper and lower addresses ADDR_A and ADDR_B are transmitted to the look-up table 104.

The revised input data generator 240 revises the currently applied input data based on the applied index information. That is, if the applied index information is '0', the input data is ignored to output '0', and if the index information is '1', 1 least significant bit (LSB) of the input data is output as revised input data. If '2' is applied as the index information, 2 bits including the LSB of the input data are output as the revised input data. The output revised input data is transmitted to the operator 106.

The look-up table 104 reads real seed values SEED_A VAL and SEED_B VAL corresponding to the applied upper address ADDR_A and the lower address ADDR_B, respectively, to output the real seed values SEED_A VAL and SEED_B VAL to the operator 106. In this case, the real seed values stored in the look-up table 104 are determined by the conditions of the input and output bits. The real seed values may be implemented so that unevenly spaced values are stored depending on the desired type of operation.

Figure 3:
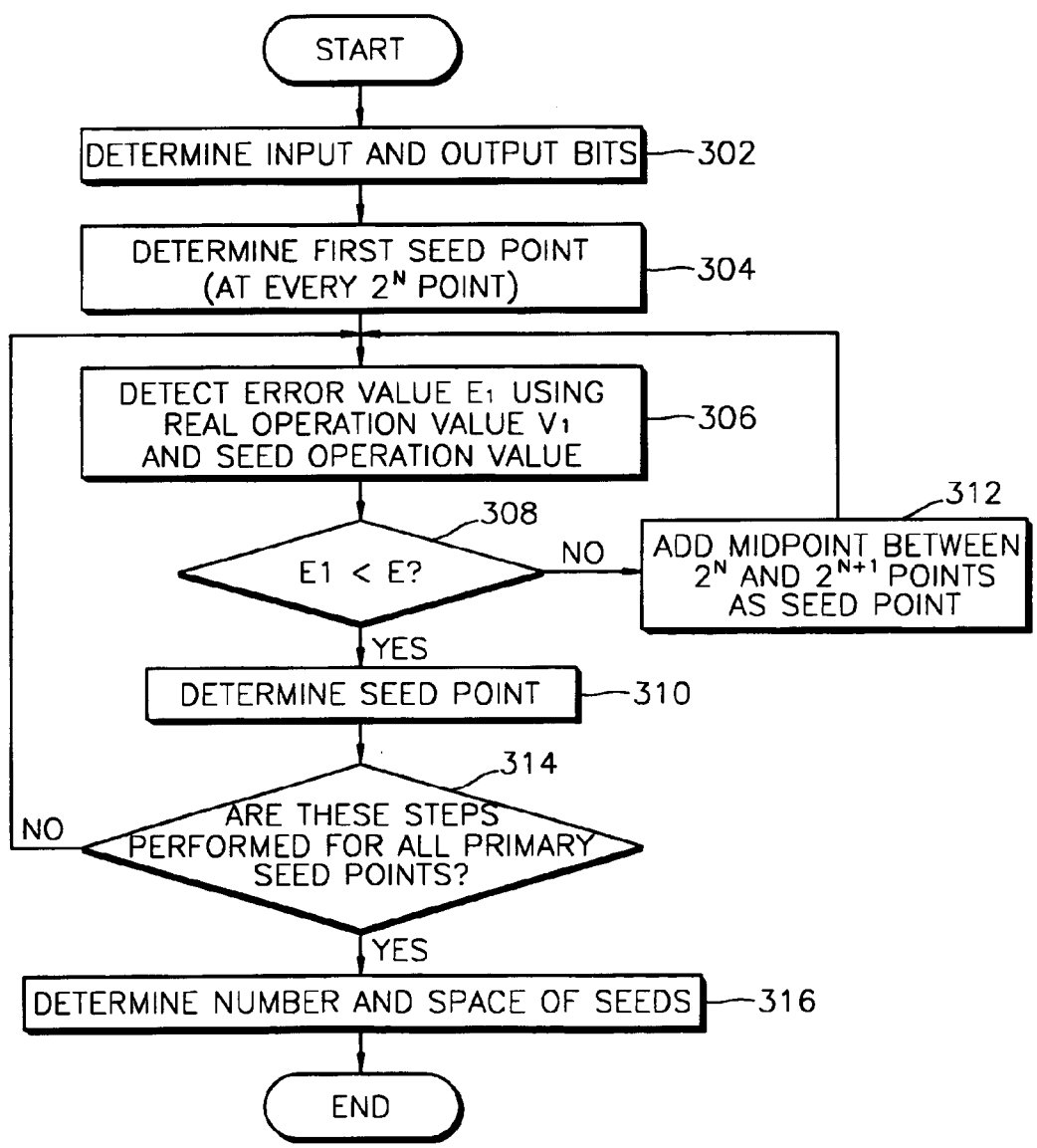
FIG. 3 is a flowchart showing a method of determining a point of a seed to be stored in the look-up table of FIG. 1 according to the present invention.

The unevenly spaced seed values stored in the look-up table 104 are determined through the process shown by the flowchart of FIG. 3. That is, FIG. 3 is a flowchart for determining which point of an input X is set as a seed point. In step 302, the ranges of input and output are determined by the input and output bits. In step 304, primary seed points are determined in an evenly spaced manner. That is, points equal to $2^0$, $2^1$, . . . , $2^N$, $2^{N+1}$, . . . , which are $2^N$ points corresponding to input bits, are determined as the primary seed points as shown on the X-axis of FIG. 4. Next, through steps 306 and 316, the number and space of seeds to be established between each of the seed points are determined. That is, in step 306, the difference between a real operation value for a midpoint between $2^N$ and $2^{N+1}$ (V1 of FIG. 4, for example), and an operation value V1' for $2^N$ and $2^{N+1}$ points, which is obtained from Equation (1), is detected as an error value E1.

$$V1'=SEED\_A\ VAL-(((SEED\_A\ VAL-SEED\_B\ VAL)\times(2^N-R'))/(2^{N+1}-2^N)) \quad (1)$$

where R' is a intermediate value of $2^N$ and $2^{N+1}$, and SEED_A VAL and SEED_B VAL are seed values corresponding to $2^N$ and $2^{N+1}$ points, respectively.

Figure 4:
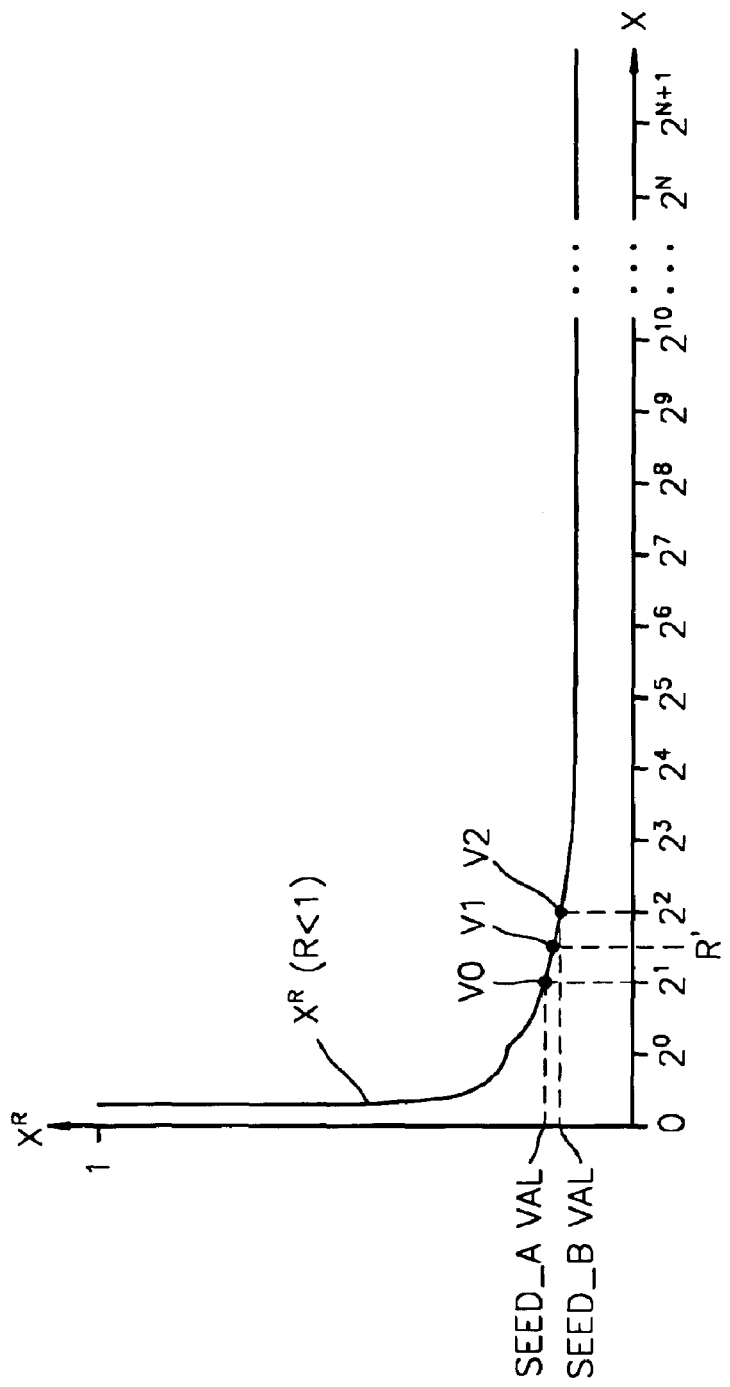
FIG. 4 is an exemplary diagram for explaining the method of determining a seed point shown in FIG. 3.

For example, if the number of seeds and the space therebetween are determined at an interval for input data between $2^1$ and $2^2$ as shown in FIG. 4, $2^N$ and $2^{N+1}$ in Equation (1) correspond to $2^1$ and $2^2$, respectively, and R' is 3. Also, in this case, 'V0' and 'V2' corresponding to SEED_A VAL and SEED_B VAL are $2^R$ and $4^R$. FIG. 4 shows an example in which an operation value corresponding to input data has nonlinearity and inverse proportion characteristics when R<1, and 0<$X^R$<1.

In step 308, it is checked whether the error value E1 detected in the step 306 is less than a preset error value E. The preset error value E is determined by an error rate between the real operation value and the operation value obtained as a result of operation of Equation (1). If the error value E1 detected in the step 306 is less than the preset error value E, this means that the detected error value E1 satisfies the error rate conditions available from the corresponding operation value detecting apparatus. Thus, in step 310, the $2^N$ and $2^{N+1}$ points are determined as seed points.

Conversely, if the preset error rate E is less than or equal to the error rate E1 detected in the step 306, the midpoint (R' of FIG. 4) between $2^N$ and $2^{N+1}$ points is added as a seed point, and then the process flow returns to the step 306. At that point, the steps 306 through 312 are performed for an interval between $2^N$ and R'. The steps are repeatedly performed until the error value E1 detected in the step 306 is detected to be less than the preset error E. Thus, if the midpoint is added as a seed point in the step 312, seed points including the added seed point are determined in the step 310.

In step 314, it is checked whether or not the steps 306 through 310 are performed for all seed points determined as primary ones. If it is determined that those steps have been not performed for all seed points, the process flow returns to the step 306 so that treatment for the next seed point can be made. On the other hand, if it is determined that those steps have been performed for all seed points, the number of seeds and the space between seeds for input data X are determined in step 316 and then a task for determining seed points is terminated. At that point, seed values corresponding to the determined seed points are stored in the look-up table 104.

The operator 106 operates two seed values SEED_A VAL and SEED_B VAL provided from the look-up table 104 and revised input data provided from the address and data generator 102, as shown in Equation (2) below, to output an operation value Y corresponding to input data.

$$Y=\text{SEED\_A VAL}-(((\text{SEED\_A VAL}-\text{SEED\_B VAL})\times\text{revised input data})/(2^{N+1}-2^N)) \quad (2)$$

Figure 5:
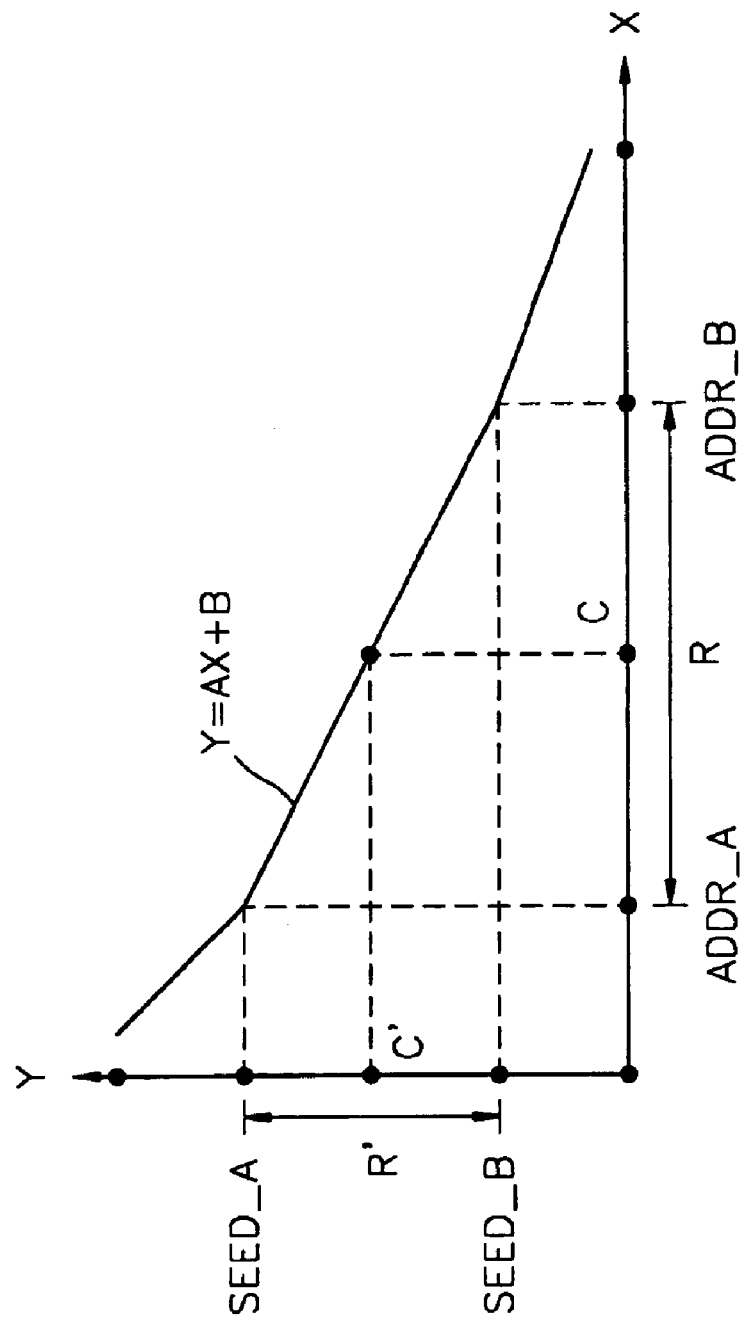
FIG. 5 is an exemplary diagram for explaining the operation of the operator of FIG. 1.

FIG. 5 is an exemplary diagram for explaining an operation process in the operator 106. FIG. 5 shows an example in which an operation value C' is obtained using Equation (2) above assuming that the desired operation is 'Y=AX+B', the currently input data is 'C', points corresponding to $2^N$ and $2^{N+1}$ are ADDR_A and ADDR_B, respectively, the difference between which is R, and seed values corresponding to ADDR_A and ADDR_B are SEED_A VAL and SEED_A VAL, respectively, the difference between which is R'.

As described above, according to the present invention, first, a value to be stored in a look-up table is determined so that a seed corresponding to a predetermined operation value for input data can be used as a value corresponding to a minimum seed point (unevenly or evenly spaced point) which satisfies a desired error rate considering input and output ranges. Then, an address corresponding to a seed value to be read from the look-up table and revised input data to be used for operation are generated according to the input data and a real seed address of a seed value stored in the look-up table. Finally, operation using the seed value read from the look-up table and the revised input data is performed to obtain an operation value corresponding to the input data. Accordingly, the present invention provides an operation value having a minimum error rate at high speed with a small sized memory.

What is claimed is:

1. An apparatus for detecting an operation value for input data comprising:

a means for storing seed values corresponding to seed points determined according to a range of the input data and output data and an error rate;

an address and data generator for comparing a predetermined reference value with the input data to generate an address of the storing means and revised input data corresponding to the input data; and an operator for performing a predetermined operation to output an operation value corresponding to the input data, using the seed values output from the storing means and the revised input data generated by the address and data generator, wherein the seed values stored in the storing means consist of values corresponding to unevenly spaced seed points, and wherein the address and data generator comprises:

a comparison unit for comparing the predetermined reference values with the input data;

an index generator for generating predetermined index information according to a comparison result output from the comparison unit;

an address generator for generating addresses corresponding to the input data based on the index information output from the index generator; and a revised input data generator for generating said revised input data corresponding to the input data based on the index information output from the index generator.

2. The apparatus of claim 1, wherein the predetermined reference values are set of 2 correspond to the differences between real seed addresses, are changed.

3. The apparatus of claim 2, wherein the comparison unit consists of comparators for setting the predetermined reference values as the real seed addresses before the power of 2 corresponding to the difference in addresses is changed.

4. The apparatus of claim 3, wherein the number of the comparators is equal to the number of powers of 2 having different values when the value representing the power of 2 is used for seeds stored in the storing means.

5. The apparatus of claim 1, wherein the index generator analyzes the comparison result and outputs a value corresponding to a power of 2, said power of 2 corresponding to a difference between real seed addresses, as the index information.

6. The apparatus of claim 1, wherein the address generator generates corresponding upper and lower addresses depending on the result of determining which of the real seed addresses of the storing means approaches the input data based on the index information.

7. The apparatus of claim 6, wherein the operator multiplies the difference between a first seed value stored in the storing means corresponding to the upper address and a second seed value stored in the storing means corresponding to the lower address by the revised input data, divides the multiplied result by the difference between the upper address and the lower address, subtracts the divided result from the first seed value, and outputs the subtracted result as an operation value corresponding to the input data.

8. The apparatus of claim 1, wherein the revised input data generator determines bits to be output on the basis of the least significant bit of the input data, and outputs the determined bits as the revised input data.

9. An apparatus for detecting an operation value for input data comprising:

a means for storing seed values corresponding to seed points determined according to a range of the input data and output data and an error rate;

an address and data generator for comparing a predetermined reference value with the input data to generate an address of the storing means and revised input data corresponding to the input data; and an operator for performing a predetermined operation to output an operation value corresponding to the input data, using the seed values output from the storing means and the revised input data generated by the address and data generator, wherein the address and data generator comprises:

a comparison unit for comparing the predetermined reference values with the input data;

an index generator for generating predetermined index information depending on a comparison result output from the comparison unit;

an address generator for generating addresses corresponding to the input data based on the index information output from the index generator; and a revised input data generator for generating said revised input data corresponding to the input data based on the index information output from the index generator.

10. A method for detecting an operation value corresponding to input data comprising the steps of:

(a) storing seed values corresponding to seed points determined according to ranges of the input data and output data and an error rate;

(b) analyzing which addresses of the stored seed values approach the input data;

(c) generating an upper address and a lower address corresponding to the input data according to the analyzed result in the step (b);

(d) reading seed values corresponding to the upper and lower addresses generated in the step (c) from the seed values stored in the step (a):

(e) revising the input data according to the analyzed result in the step (b); and (f) performing a predetermined operation using the seed values read in the step (d), and the revised input data, to output an operation value corresponding to the input data, wherein the step (a) comprises the steps of:

(a1) determining input and output data bits depending on the ranges of the input data and output data;

(a2) determining seed points in an evenly spaced manner depending on the determined input data bits;

(a3) comparing the difference between a real operation value for an arbitrary point between first and second seed points determined in the step (a2) and an operation value using seed values corresponding to the first and second seed points with a predetermined reference value;

(a4) setting the first and second seed points as seed points if the difference between the operation values is less than the predetermined reference value; and (a5) adding the arbitrary point as the seed point existing between the first and second seed points if the difference between the operation values is not less than the first predetermined reference value.

11. The method of claim 10, further comprising the step of repeatedly performing the steps (a3) through (a5) until the difference between the operation values is less than the predetermined reference value.

* * * * *